Nov. 6, 1956  J. A. E. HAHN  2,769,385
GARDEN TOOL
Filed Oct. 19, 1953
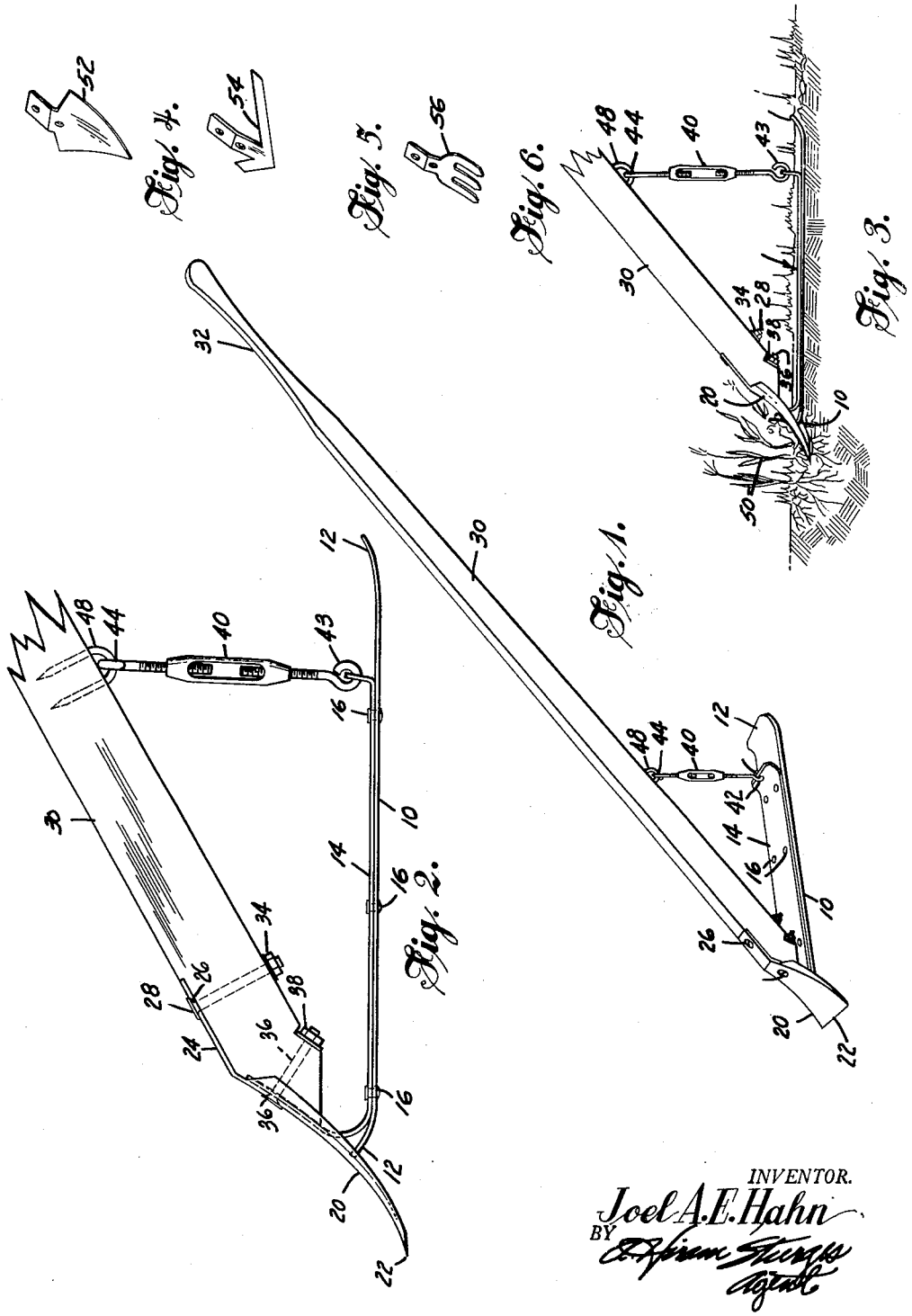
INVENTOR.
Joel A. E. Hahn
BY

# United States Patent Office 2,769,385
Patented Nov. 6, 1956

2,769,385
GARDEN TOOL
Joel A. E. Hahn, Beatrice, Nebr.

Application October 19, 1953, Serial No. 386,921

3 Claims. (Cl. 97—58)

This invention relates to garden tools and in particular it is the object of this invention to provide a garden tool for multiple uses including digging out weeds, cultivation and for making seed planting furrows.

A particular object it is to provide a garden tool having a sharp chisel-like member at its forward end adapted to be pushed through the ground with its blade at an acute angle with respect to the ground. The forward-most edge of the blade is preferably disposed approximately horizontal for minimizing the resistance during a horizontal weed cutting motion through the ground.

A further object of the invention is to provide a runner for engaging the ground and for sliding over the ground much like a sled runner or ski. As the runner is normally horizontally disposed in engagement with the ground, it prevents the blade from burying itself in the ground to an unwanted degree.

A further object of the invention lines in the provision of a garden tool which can be used for making furrows of uniform depth, and which has means for changing at will the depth of the furrow to be made. Also, means are provided for changing the angle at which the tool enters the ground.

A further object of the invention is the provision of a garden tool which has means for adjusting the height of the handle to suit the needs of the operator.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as described by those skilled in the art without departing from the present invention and the purview of the appended claims.

In the drawings:

Figure 1 is a perspective of the tool.

Figure 2 is a side elevation showing the operating portion of the tool.

Figure 3 is a detail showing the tool in operation.

Figures 4, 5 and 6 are interchangeable blades, trowels and forks which may be attached and detached at will.

Referring to the drawings, the garden tool of this invention is provided with an approximately horizontally disposed runner member 10. The runner member 10 is of a flat elongated rectangular shape and has each of its end portions 12 turned upwardly in a short arc.

A flexible resilient securing member or spring 14 is disposed in vertical parallelism with the runner member 10 and is rigidly secured to the upper surface thereof by means of spaced apart rivets 16. The spring 14 is preferably formed of a resilient material, such as spring steel as illustrated in the drawings.

The rearward end of the spring 14 is positioned a short distance forwardly of the rearward end of the runner member 10. The rearward end of the spring 14 is upturned in a substantially right angle. The spring 14 extends forwardly to a point adjacent the forwardmost end of the runner 10 and then curves first upwardly and forwardly, then rearwardly and upwardly therefrom, forming an acute angle with relationship to the horizontal disposition of the runner member 10.

A cutting blade 20 is provided and is disposed forwardly of the forwardmost end of the runner 10 and is of a substantially triangular shape having a broad cutting edge 22 transversely disposed with respect to the longitudinal center line of the runner 10, the edge falling below the horizontal line of the under surface of the runner 10.

The forward surface of the blade 20 is slightly concave and extends upwardly and rearwardly generally in approximate alignment with a handle 30 at an acute angle with respect to the bottom of the runner 12.

The handle 30 extends upwardly and rearwardly of the blade at an acute angle with respect to the bottom of the runner 12, the upper end of the handle having a portion of lesser size at 32 adapted to be gripped by the operator.

The uppermost end of the blade 20 has a flat elongated portion 24 which extends upwardly and rearwardly along the upper edge of the handle 30.

The upper end portion 24 of the blade 20 is provided with an aperture 26 for receiving a bolt 28 which latter secures the blade 20 to the upper surface of the lower end of the elongated handle member 30, the bolt 28 passing through an aperture provided in the upper end portion 24 of the blade 20, through an opening provided in the handle 30, the bolt being held by a nut 34.

The upwardly and rearwardly curved forward end of the spring 14 is also suitably secured to the upper surface of the lower portion of the handle 30 by means of a bolt 36.

The bolt 36 extends through openings in the upper portion of both the blade 20, the upper end of the spring 14, the lower end of the handle 30, the bolt being held by a nut 38.

The handle 30 is provided with a gripping portion 32 at its rearwardmost end.

As thus far described the resiliency of the spring 14 would not hold the blade 20 in a suitable position for use, therefore an additional adjustment is provided for fixing the runner in any one of a plurality of acute angular positions with respect to the handle 30.

The inventor understands that a variety of resilient materials could be used to form the angle adjusting member 14 such as, for example, a hinge arrangement.

The inventior also concedes that a variety of arrangements may be employed to set the angle between the runner and the handle thereby adjusting the angle at which the blade 20 is presented to the ground but the preferred embodiment, as illustrated in the drawings, is a turnbuckle assembly 40.

The turnbuckle assembly 40 is vertically disposed between and secured to the upturned rearward end of the spring 14 and the under surface of the upwardly and rearwardly extending elongated handle 30 by means now to be described.

An aperture 42 is provided in the upturned rearward end of the angle member 14 and receives an eye 43 of a turnbuckle 40. The upper eye 44 of the turnbuckle 40 is secured by a staple 48 to the underside of the handle 30.

As thus described it will be seen that the operator by adjusting the turnbuckle 40 can selectively set the angular relationship between the handle and the bottom of the runner. This makes it possible to control the height of the handle for adjusting to the height of different operators and also makes it possible to adjust the angle at which the blade approaches the earth.

The resiliency of the spring connection between the runner and the handle serves to cause the runner to automatically move outwardly from the handle as the turnbuckle is operated and has a particular advantage in that it prevents the parts of the turnbuckle from rattling.

In Figure 3 the tool is shown cutting weeds 50 a short distance below the ground. The forward and downward pushing by the operator is transferred into forward motion by the action of the runner.

Similar motion can be used for loosening the ground and for digging seed planting furrows.

In Figure 4 an auxiliary tool is shown at 52, the lower portion of which is pointed, having an advantage in digging said planting furrows. A further auxiliary tool is shown at 54 in Figure 5 of good advantage in ground loosening. A fork tool is shown at 56 in Figure 6. All of these tools are interchangeable.

From the foregoing description, it is through to be obvious that a garden tool constructed in accordance with my invention is particularly well adapted for use, by reason of the convenience and facility with which it may be assembled and operated, and it will be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A garden tool comprising a runner member adapted to be pushed across the ground in an approximately horizontal position, the undersurface of said runner being substantially smooth, a blade disposed at the forward end of said runner, said blade having a forward surface disposed at an acute angle with respect to the bottom of said runner, an elongated handle extending upwardly and rearwardly form said blade and adapted to be gripped by an operator at its upper end, a resilient member attached to the upper side of said runner and curving first forwardly and upwardly and then rearwardly and upwardly therefrom, the upper end of said resilient member being attached to said handle, and in which adjustable means is provided for connecting the rearward end of said runner with said handle for adjusting the angular relationship of said handle with respect to the bottom of said runner, means securing said blade to said handle.

2. A garden tool comprising a runner member adapted to be pushed across the ground in an approximately horizontal position, the undersurface of said runner being substantially smooth, a blade disposed at the forward end of said runner, said blade having a forward surface disposed at an acute angle with respect to the bottom of said runner, an elongated handle extending upwardly and rearwardly from said blade an adapted to be gripped by an operator at its upper end, means for securing said runner to said handle at the forward end of said runner, said securing means being flexible for variation of the angular relationship between said runner and said handle, and in which a turnbuckle is disposed between the rearward end of said runner and said handle, means attaching said turnbuckle to the rearward end of said runner, and means attaching the upper end of said turnbuckle to a point on said handle above the rearward end of said runner, means securing said blade to said handle.

3. A garden tool comprising a runner member adapted to be pushed across the ground in an approximately horizontal position, the undersurface of said runner being substantially smooth, a blade disposed at the forward end of said runner, said blade having a forward surface disposed at an acute angle with respect to the bottom of said runner, an elongated handle extending upwardly and rearwardly from said blade and adapted to be gripped by an operator at its upper end, a resilient member extending along the top of said runner, the forward end of said resilient member bending upwardly and rearwardly and being attached to said handle at its upper end, the rearward end of said resilient member being turned upwardly from said runner, and means for adjusting the acute angular relationship between said runner and said handle, said adjusting means being attached to the upturned rearward end of said resilient member, and means securing said blade to said handle.

References Cited in the file of this patent

UNITED STATES PATENTS

| | | |
|---|---|---|
| 462,742 | Scott | Nov. 10, 1891 |
| 529,562 | Mortenson | Nov. 20, 1894 |
| 1,553,919 | Smith | Sept. 15, 1925 |
| 2,141,533 | Hubbell | Dec. 27, 1938 |